United States Patent Office 3,165,382
Patented Jan. 12, 1965

3,165,382
DECOMPOSITION OF HYDRAZINE
Mark R. Forte, Belleville, N.J., assignor to Specialties Development Corporation, Belleville, N.J., a corporation of New Jersey
No Drawing. Filed July 6, 1961, Ser. No. 122,097
2 Claims. (Cl. 23—212)

The present invention relates to the decomposition of hydrazine in either liquid or vapor state to ammonia and nitrogen, and, more particularly, to promoting the secondary reaction to produce nitrogen and hydrogen.

It is known that when hydrazine is heated by the application of heat from an electrical heating element or the like, the hydrazine initially decomposes in accordance to the reaction:

$$3N_2H_4 \rightarrow 4NH_3 + N_2$$

This reaction is exothermic and produces gases at 2500° F. It is also known that at such temperatures the ammonia endothermically decomposes and effects the decomposition reaction in the following manner:

$$3N_2H_4 \rightarrow 4(1-x)NH_3 + (2x+1)N_2 + 6xH_2 + (144,300 - 79,200x) \text{ B.t.u.}$$

where $x$ represents the percent of ammonia dissociated. As can be seen the net energy liberation is reduced by the secondary reaction; namely, ammonia dissociation. A decrease in the energy level shows up as a decrease in the decomposition temperature. In practice, the decomposition temperature can be varied from 1600° F.–2000° F. depending upon the amount of catalyst present.

The foregoing reactions take place in a decomposition chamber which is constructed to withstand such high temperatures but has a limited useful life, whereby it is highly advantageous to promote the second reaction and cause it to take place almost instantly so that the temperature of the total reaction products is reduced to 1800° F. and below. At this lower temperature the decomposition chamber and equipment utilizing this gas has a longer useful life.

It has therefore been customary to promote the secondary reaction by means of a catalyst carried by pellets of alumina. These catalysts have been unsuccessful because they disintegrated physically and therefore had to be replaced quite frequently.

Accordingly, an object of the present invention is to provide a catalyst which effectively causes the ammonia to decompose to produce a desired lower temperature and can withstand that temperature without physical impairment for much longer periods than other known catalysts.

Another object is to provide such a catalyst which can be readily handled and installed in the decomposition chamber or the passages leading thereto.

A further object is to provide such a catalyst which is relatively inexpensive and is readily available.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been discovered that the decomposition of the ammonia can be promoted by passing the products of the initial hydrazine reaction through a catalyst chamber containing a structure of an alloy consisting essentially of nickel and chromium, with and without iron.

In practicing the invention, the structure was in the form of discs of wire screening having a diameter of about two inches, and the decomposing hydrazine was passed through a catalyst bed containing a number of these screens. The screen was constructed of wires having a .023 inch diameter where were plain woven to provide an 8 x 8 mesh having about .078 inch openings.

Such wires may be formed of nickel-chromium alloys consisting essentially of approximately 60 to 85% nickel, 11 to 22% chromium, and zero to 25% iron, with impurities such as manganese and silica being present in amounts totaling less than 1%. Such alloys sold under the trade name "Nichrome," are readily available in wire screen form of various meshes.

A number of screens, for example twenty five, formed of an alloy of about 65% nickel, about 11% chromium and about 23% iron were inserted into the decomposition chamber of an auxiliary power unit for missiles, and a one pound charge of liquid hydrazine was thermally decomposed and the products of the initial reaction were passed through the screens in a period of 0.1 minute to promote the secondary reaction. It was observed that the reaction temperature in the chamber did not exceed 1800° F. at any time and that the chamber pressure did not vary, thus indicating that the secondary reaction was promoted instantly. This test was repeated six times under continuous flow conditions in excess of four hours, and the reaction temperature in the chamber did not exceed 1800° F. at any time and the chamber pressure did not vary.

After the last test was completed and the decomposition chamber had cooled, the screens were removed and were examined microscopically. It was found that the wire mesh had resisted nitriding, disintegration, and erosion.

The foregoing tests were repeated with similarly dimensioned wire screens formed of an alloy composed of 80% nickel and 20% chromium, and again the screens were not impaired.

Further tests indicated that wire screen in accordance with the present invention has a useful life of about fifty hours, whereas the useful life of the catalyst for promoting the secondary reaction previously used seldom exceeded four hours.

From the foregoing description, it will be seen that the present invention provides a process for rapidly and effectively promoting the secondary decomposition of ammonia in the decomposition of hydrazine which maintains the temperature of the decomposition chamber at a minimum and prolongs the useful life of the chamber.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

This application is a continuation-in-part application of Serial No. 782,387, filed December 23, 1958, now abandoned.

I claim:
1. In a process wherein hydrazine is initially thermally decomposed to produce a mixture of ammonia and nitrogen having a temperature of about 2500° F., the step which consists in promoting the decomposition of the mixture to nitrogen and hydrogen by passing the mixture through a decomposition chamber and contacting a perforated structure in the chamber composed of an alloy consisting essentially of between about 60% and about 85% nickel, between about zero and about 25% iron and between about 11% and about 22% chromium, the alloy being characterized in that it instantly promotes the decomposition of the mixture to reduce the temperature thereof within the chamber, maintains the temperature within the chamber at about 1800° F., resists nitriding, disintegration and erosion, and has a useful life of about fifty hours.

2. The process according to claim 1, wherein the structure is in the form of a plurality of wire screens having openings of about .078 inch.

References Cited in the file of this patent

UNITED STATES PATENTS

| | | |
|---|---|---|
| 2,780,638 | Ayers et al. | Feb. 5, 1957 |
| 2,930,184 | Plescia et al. | Mar. 29, 1960 |

FOREIGN PATENTS

| | | |
|---|---|---|
| 387,318 | Great Britain | Apr. 29, 1931 |